A. R. DODGE.
MEANS FOR INCREASING THE VELOCITY OF FLUIDS FOR METERING PURPOSES.
APPLICATION FILED DEC. 14, 1912.
1,145,234.
Patented July 6, 1915.
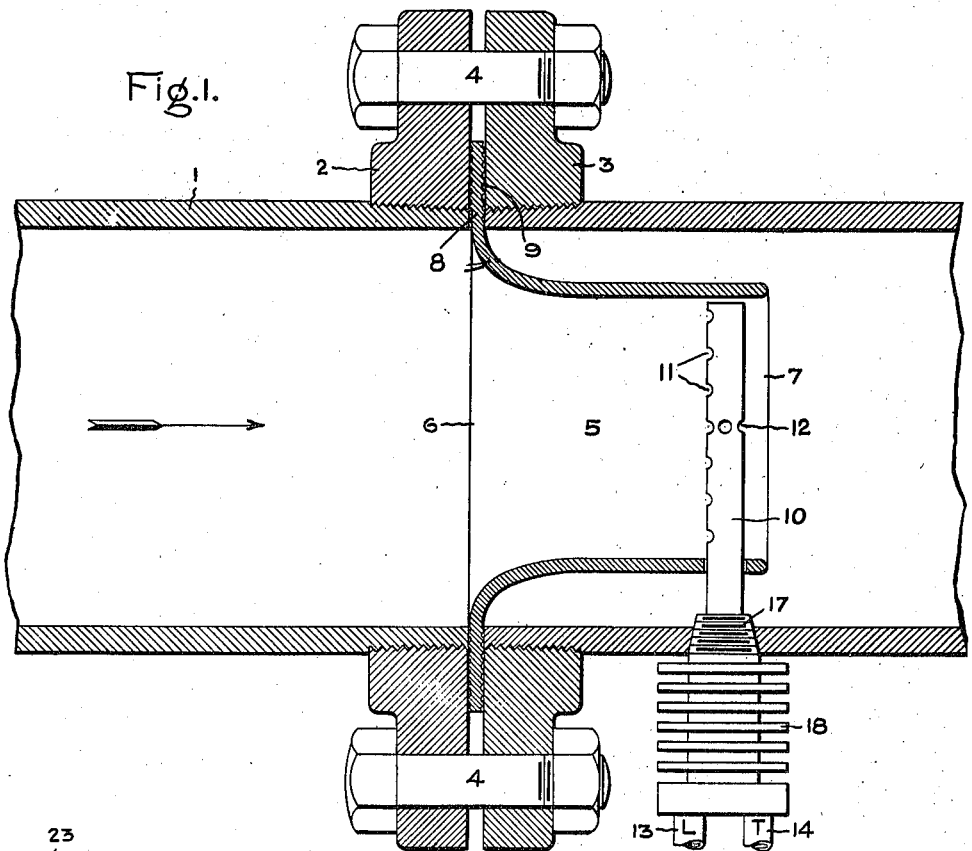
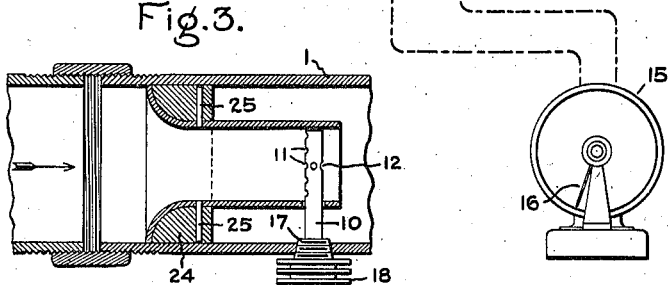
Witnesses:
Marcus L. Byng.
J. Ellis Glen.
Inventor:
Austin R. Dodge,
by
His Attorney.

UNITED STATES PATENT OFFICE.

AUSTIN R. DODGE, OF SCHENECTADY, NEW YORK, ASSIGNOR TO GENERAL ELECTRIC COMPANY, A CORPORATION OF NEW YORK.

MEANS FOR INCREASING THE VELOCITY OF FLUIDS FOR METERING PURPOSES.

1,145,234.

Specification of Letters Patent.   Patented July 6, 1915.

Application filed December 14, 1912.   Serial No. 736,722.

*To all whom it may concern:*

Be it known that I, AUSTIN R. DODGE, a citizen of the United States, residing at Schenectady, county of Schenectady, State of New York, have invented certain new and useful Improvements in Means for Increasing the Velocity of Fluids for Metering Purposes, of which the following is a specification.
There are on the market at the present time meters for measuring the rate of flow of fluids passing through conduits. Briefly one type comprises a nozzle plug operating after the fashion of a Pitot tube which is inserted in the pipe to be metered and some form of indicating or recording meter mechanism movable in response to pressure differences created by the plug, suitable pipes connecting the two. Where the velocity of the fluid flowing through the pipe is moderately high no trouble is experienced in making accurate meter readings, but where the velocity is low it is difficult unless the meter be made extremely delicate, in which case it becomes less satisfactory as a commercial instrument. Good practice dictates that the velocity of steam in pipes should be rather low to avoid losses by friction. In many power stations the piping is so large that the velocity of the steam, especially at low and moderate loads, is far below that which is considered necessary by the best authorities and that which can be readily metered. However this piping is very expensive and costly to install and hence cannot advantageously be replaced.

The problem thus presented is how to increase the velocity of the steam or other fluid for metering purposes without changing the existing piping in power plants on the one hand or causing undue losses by friction on the other, and this at a small expense. I have solved this problem by inserting in the pipe to be metered a thin funnel shaped nozzle made of suitable metal through which all of the fluid must pass and which is so shaped as to gradually increase the velocity of all of the fluid between its inlet and outlet and this without causing undue friction and losses incident thereto and combining with it a nozzle plug and its connected meter. The nozzle preferably has a supporting flange connected with the throat portion that extends perpendicular to its axis and is located between the parts of the coupling which unites two adjacent conduit sections. This flange also serves as a means to cause all of the fluid in the conduit to pass through the nozzle. This is important since the feature of the invention is to increase the velocity of the fluid and if any fluid leaks past the nozzle the effective action of the latter will be decreased or will be rendered ineffective. The funnel shaped nozzle not only has the function of increasing the velocity of the fluid but it also insures more accurate metering for the reason that owing to its shape it gives the proper direction to the fluid particles and at the same time prevents eddies which disturb the indications of the meter. The flange may also serve as a gasket for the coupling, and the continuity of the pipe line is not interrupted. The nozzles can be spun or otherwise accurately formed and their installation is a simple and relatively inexpensive matter. Into the end of the nozzle having the reduced cross-section, I insert the nozzle plug and connect said plug to the meter proper.

In the accompanying drawing which is illustrative of my invention, Figure 1 shows a fluid conveying conduit in longitudinal section that is fitted with my improved device for increasing velocity of the fluid; and Figs. 2 and 3 are detail views of slight modifications.

1 indicates a main or conduit for the fluid, such as steam, for example, which is uniform in cross-section and conveys fluid to an engine or other apparatus. The conduit is made in sections as usual and the adjacent ends are screw threaded to receive the parts 2 and 3 of the coupling. The parts of the coupling are flanged and extending through the flanges are retaining bolts 4. Located inside of the pipe is a funnel shaped nozzle 5 which is designed in accordance with well known laws to gradually increase the velocity of the fluid from the inlet 6 toward the outlet 7. After the steam or other fluid leaves the nozzle its velocity will be decreased to the same value that it had prior to entering the nozzle, and hence the losses in the pipe line will be no greater than they 1 were before. By properly designing and shaping the nozzle the losses therein will be so small that they can be disregarded. The nozzle is provided with a flange 8 that is perpendicular to the axis of the nozzle, said flange acting as a support for the nozzle, and may be located between the opposed faces of the pipe coupling. For some installations, the nozzle may be made of copper and either spun or pressed to the desired shape. In this case the flange may with advantage act as a gasket and be provided with corrugations 9 so as to insure a fluid tight joint between the faces of the coupling. This flange should be made thin so that it will occupy little space thereby avoiding the necessity of shortening one or both sections of the conduit 1. In addition to forming a gasket the flange 8 also serves as a means for supporting the nozzle centrally within the conduit. Near the discharge end of the nozzle an opening is provided to receive the nozzle plug 10, the latter being provided with a series of openings 11 facing the moving column of fluid and one or more orifices 12 that face in the opposite direction. The orifices 11 communicate with the small tube 13 and the orifice 12 with the tube 14. These tubes are connected to the manometer 15 which may be of any suitable construction. As shown the manometer is of the indicating type and is provided with a pointer or needle 16 whose position is determined by the pressure difference created by the nozzle plug. The pressure due to the orifices 11 is equal to the static pressure plus an amount due to the velocity head, while the pressure due to the orifice 12 is equal to the static pressure. The nozzle plug is provided with a suitable base having a screw threaded portion 17 that enters a threaded opening in the pipe. The base is also provided with radiating fins 18 to condense the steam in the passages in the nozzle plug.

In Fig. 2 is shown an arrangement suitable for very large conduits. The nozzle is made in two principal parts, a flanged throat portion 20 and a cylindrical portion 21, both made of steel or some other hard metal adapted to resist the action of superheated steam. The parts of the nozzle are united by a ring 22 which is riveted to said parts. The flange of the throat portion is situated between the adjacent ends of the conduit sections, and between the parts of the coupling is a suitable gasket 23 made in the form of a ring and preferably compressible to a limited extent.

In Fig. 3 is shown a further modification, in which a ring 24 is provided that has a forced fit in the conduit. It has a curved face that acts to support the throat portion of the nozzle. The parts are united by pins 25.

The specific construction of the nozzle plug forms no part of the present invention since it forms the subject matter of a pending application for a United States patent, Serial No. 517,299, filed September 11, 1909. The specific construction of the manometer forms no part of the present invention since it forms the subject matter of my pending application for a United States patent, Serial No. 482,457, filed March 10, 1909. I may also use other forms of pressure difference devices and manometer without departing from my invention.

I am aware that it has been proposed to insert a disk in a pipe to be metered, such disk having a restricted straight bored orifice with connections to the manometer leading from opposite sides of said disk. Such an arrangement is undesirable for the reason that it gives rise to losses due to friction and because it is not shaped to increase the velocity of the fluid, but merely acts as a restriction for creating pressure differences on opposite sides due to the resistance offered to the passage of fluid.

As will readily be seen, my improved arrangement does away with the necessity of changing the diameter of the pipe or conduit, or of inserting an expensive Venturi tube as a part of the main line as has sometimes been found necessary heretofore. The labor involved in inserting or removing my improved arrangement is slight and no physical change in the pipe line itself is necessary.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In an apparatus for metering low velocity fluids, the combination with the conduit through which the fluid to be metered flows, of a funnel-shaped nozzle located in said conduit through which all the fluid flows, the larger end of said nozzle facing the direction of flow so that all the fluid in flowing through it has its velocity uniformly increased, a device projecting into said conduit adjacent the smaller end of said nozzle that is adapted to be acted on by the flowing fluid to create a pressure difference responsive to changes in the rate of flow of the fluid to be metered, said device being acted on by the fluid after its velocity has been increased by the nozzle, and a manometer connected to said device.

2. In an apparatus for metering low velocity fluids, the combination with the conduit through which the fluid to be metered flows, of a funnel-shaped nozzle located in said conduit through which all the fluid flows and having an opening through its wall adjacent its smaller end, the larger end of said nozzle facing the direction of flow so that all the fluid in flowing through it has its velocity uniformly increased, a Pitot tube device projecting into said conduit and through the opening in the wall of the nozzle that is adapted to be acted upon by the flowing fluid to create a pressure difference responsive to changes in the rate of flow of the fluid to be metered, said device being acted on by the fluid after its velocity has been increased by the nozzle, and a manometer connected to said device.

3. In an apparatus for metering low velocity fluids, the combination with a conduit formed of a plurality of pipe sections through which the fluid to be metered flows, of a funnel-shaped nozzle having a flange perpendicular to its axis, said nozzle being arranged in said conduit with its larger end facing the direction of flow and with its flange between two adjacent pipe sections, and also so arranged that all the fluid passes therethrough so that its velocity is uniformly increased, means for clamping adjacent pipe sections together which also clamp the flange and hold the nozzle in place, and a device arranged adjacent the smaller end of said nozzle which is acted on by the fluid after its velocity has been increased and is adapted to create a pressure difference which bears a definite relation to the rate of flow.

In witness whereof, I have hereunto set my hand this 12th day of December, 1912.

AUSTIN R. DODGE.

Witnesses:
BENJAMIN B. HULL,
HELEN ORFORD.